United States Patent [19]
Kester et al.

[11] Patent Number: 4,712,756
[45] Date of Patent: Dec. 15, 1987

[54] SHOCK CORDED TRIPOD STAND

[75] Inventors: Eugene A. Kester, Los Gatos; Scott P. Reeves, Campbell; Danny Zemanek, Sunnyvale, all of Calif.

[73] Assignee: Photoflex Products, Campbell, Calif.

[21] Appl. No.: 855,755

[22] Filed: Apr. 23, 1986

[51] Int. Cl.⁴ ............................................. F16M 11/32
[52] U.S. Cl. .................................... 248/165; 248/166; 248/125; 248/187; 248/188
[58] Field of Search ............... 248/165, 166, 160, 432, 248/121, 122, 460, 463, 464, 461, 462, 125, 187, 188, 231.3, 316.2, 316.3, 544, 447.2, 511–514, 528, 529, 535, 541, 225.31, 229, 230, 231.2, 231.8, 313, 316.1, 316.7, 295.1, 297.5, 245, 246, 74.2, 219.1, 218.4; 52/108; 135/74; 403/374, 104, 377; 24/666, 667, 129 R, 129 D, 130

[56] References Cited
U.S. PATENT DOCUMENTS

| 127,978 | 6/1872 | Iske | 248/461 |
|---|---|---|---|
| 1,646,305 | 10/1927 | Meyers | 248/460 |
| 2,398,748 | 4/1946 | Lange | 248/231.3 |
| 3,233,517 | 2/1966 | Morrison | 248/166 |
| 3,244,128 | 4/1966 | Rogalski | 248/165 |
| 3,710,734 | 1/1973 | Bofferding | 248/246 |
| 3,886,700 | 6/1975 | Lambert | 52/108 |
| 4,004,850 | 1/1977 | Nelson | 248/166 |

Primary Examiner—Reinaldo P. Machado
Assistant Examiner—A. Chin Shue
Attorney, Agent, or Firm—Michael J. Hughes

[57] ABSTRACT

The present invention in its preferred embodiment, is a collapsable and automatically assemblable shock corded tripod stand (10) constructed of a tetrahedral spider element (18) which acts as the interface between three support legs (12,14 and 16) and a vertical member (20). The legs (12, 14, and 16) and the vertical member (20) are formed from multiple first tubes (22) and second tubes (24). The force which holds the device in place and provides the impetus for the automatic assembly is tension provided by a first shock cord (48) and a second shock cord (50). The first shock cord (48) passes from the outermost tube (24) of the first leg (12), through the spider (18), and extends to the outermost tube (24) of the second leg (14). The second shock cord (50) passes from the outermost tube (24) of the third leg (16), through the spider (18), and extends to the uppermost tube (64) of the vertical member (20). When the stand (10) is disassembled, the tubes (22 and 24) are all in a position parallel to each other and bound by a strap (62). Assembly is accomplished by grasping the uppermost tube (64) and releasing the strap (62). Given sufficient clearance, gravity and the tension in the shock cords (48 and 50) will cause the vertical member (20) and the legs (12, 14, and 16) to serially assemble. Objects are attached to the stand (10) by means of one or more attachment clamps (68). The attachment clamps (68) can be affixed to either the vertical member (20) or the legs (12,14, and 16). The clamps (68) are held in place by a frictional gate lock, which is released by changing the positioned angle relative to the stand (10), which allows the positioning of the clamps (68) to be changed with one hand. The primary usage of the invention is as a photographic lightstand.

11 Claims, 5 Drawing Figures

SHOCK CORDED TRIPOD STAND

TECHNICAL FIELD

The present invention relates generally to support structure for equipment and more particularly to tripod stands.

BACKGROUND ART

The present invention was created to fill the need for a portable, collabsible support stand. Although the specific need arose in the content of lighting support in the photography industry, it is apparent that the invention can be used for any appplication requiring support of a relatively light weight object.

A professional photographer requires a geat deal of equipment to practice his craft. In addition to cameras, film, etc., proper lighting is essential. In particular, elevated adjustable lighting is often required. To this end, tripod stands are utilized.

The standard setup is a stand with a light affixed to its upper end. Vertical adjustment is achieved by leaving the light in place and telescoping the stand. With presently available equipment, the job requires both hands. This forces a photographer to put down his camera whenever he wishes to change his lighting. Similarly, the original setup is of course a two-handed job with standard equipment.

The prior art has several examples of tripod-type stands. Most seem to be relative to an easel application. The "Plural Leg Stand", U.S. Pat. No. 4,326,687, issued Apr. 27, 1982 to C. Wayne Cliburh, is one such device. Another is the "Tripod Stand", U.S. Pat. No. 4,502,654, issued Mar. 5, 1985 to Percy F. Albee, Jr.

There are also some special application devices, such as the "Readily Collapsable Portable Lighting System Having a Simplified Holder for Color Filters", U.S. Pat. No. 4,319,311, issued Mar. 9, 1982, to W. Phillip Mitchell.

All of the devices currently available have one or more of the following disadvantages: Many devices allow limited adjustment capacity as to the position of the supported object. Most of the devices cannot be stored in a very compact space. While many devices are collapsable, none return to the support position in an automatic fashion.

DISCLOSURE OF INVENTION

Accordingly, it is an object of the present invention to provide a stand for convenient support of various objects, specifically photographic lighting.

It is another object of the present invention to provide a device that can be set up and adjusted automatically, requiring the use of only one hand.

It is still a further object of the present invention that the device be collapsable so that it can be stored and transported in a very compact manner.

It is yet another object of the present invention to provide a device that will support the multiple objects simultaneously, with each object's position being individually adjustable.

Briefly, a preferred embodiment of the present invention is a shock corded tripod stand. The stand is constructed from a tetrahedral spider element and multiple tubular segments, two segments in each of the three legs and four in the vertical portion of the stand. The segments are bound together by two lengths of shock cord. The shock cord is an elasticized rope that runs through the interior of the segments. One cord is secured at the bottom of two of the legs while the other is secured at the bottom of the remaining leg and the top of the vertical portion. Both lengths of cord pass through the spider element. The length of the cord is chosen so that a constant tension is maintained. It is this tension that provides the impetus to direct the device to its assembled position when it is released from its storage position and also to maintain it in a secure arrangement once assembled.

The stand is provided with one or more attachment devices. The devices are such that they slide onto either the vertical portion or the legs, depending on the desired position of the attached object. The attachment device is fixed in place by a gate lock mechanism such that its positioning can be changed easily using only one hand.

An advantage of the present invention is that it may be used for many varied applications.

Another advantage of the present invention is that it can be set up and adjusted automatically, requiring only one hand.

A further advantage of the present invention is that it collapses to an extremely compact storage position.

A still further advantage of the present invention is that it can support multiple objects simultaneously.

These and other objects and advantages will become clear to those skilled in the art in view of the description of the best presently known mode of carrying out the invention and the industrial applicability of the preferred embodiment as described herein and as illustrated in the several figures of the drawing.

BEST MODE OF CARRYING OUT INVENTION

Figure 1:
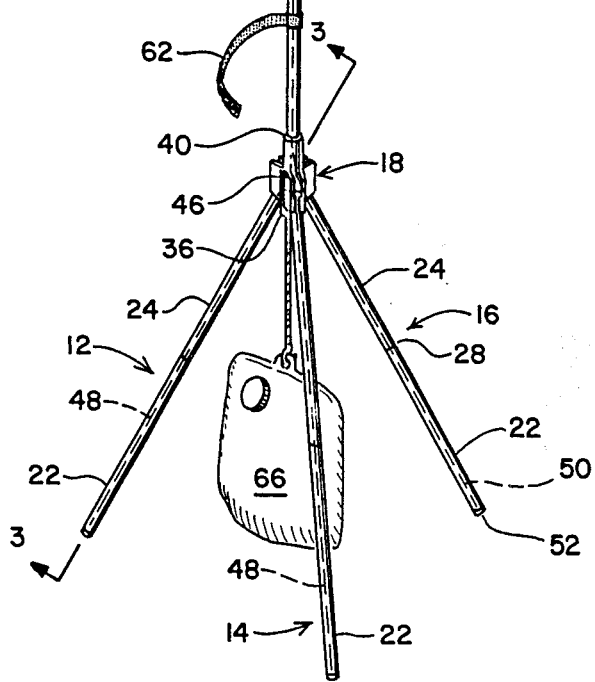
FIG. 1 is a perspective view of the shock corded tripod stand of the present invention in its assembled position.

The present invention is a shock-corded tripod stand which is shown in assembled mode in FIG. 1 and designated by the general reference numeral 10. In a preferred embodiment, the stand 10 includes a first leg 12, a second leg 14, and a third leg 16. The legs are attached to a tetrahedral spider element 18, also sometimes referred to herein as a "base", through which the legs 12, 14, and 16 and the spider collectively support a vertical member 20.

The structure of the stand 10 is such that the legs 12, 14 and 16 are positioned by the spider 18 so that they form, with the ground or floor, a regular tetrahedral pyramid. This shape is desirable for stability. As seen in the assembled mode illustrated in FIG. 1, the vertical member 20 extends vertically from the spider 18 which is situated at the pinnacle of the pyramid. This arrangement maintains the weight forces in a balanced position on the legs and assures that, so long as weight and leverage tolerances are observed in placing items on the vertical member, the assembled stand 10 will have excellent stability.

Figure 2:
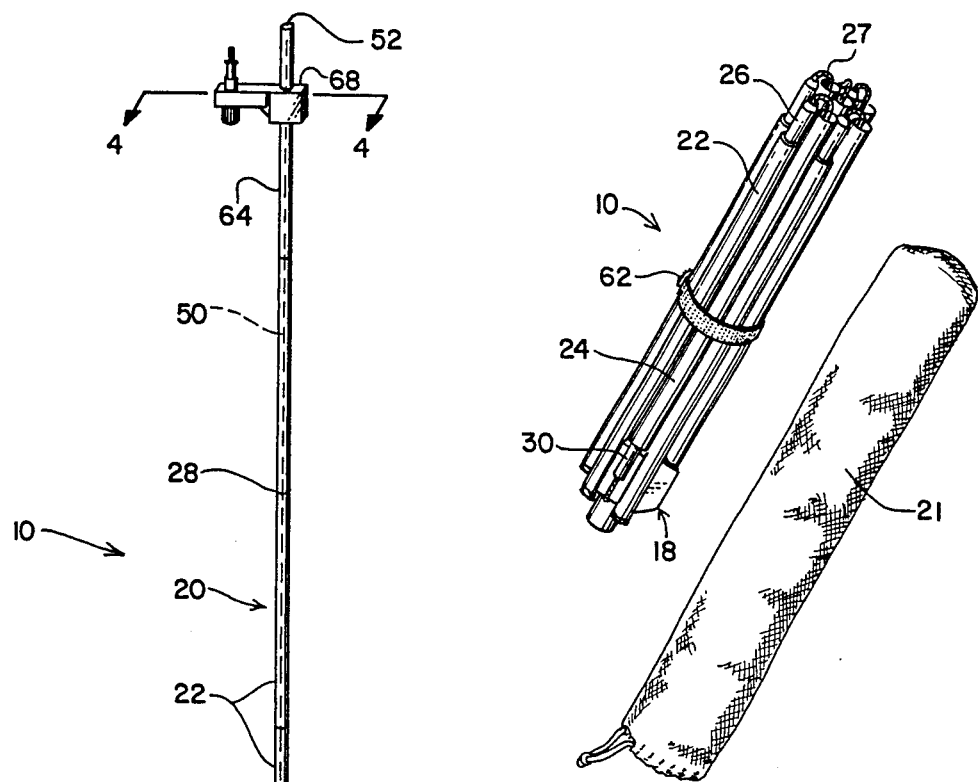
FIG. 2 is a perspective view of the present invention in its stored position.

The illustration of FIG. 2 shows the stand 10 in collapsed mode. This exemplifies the compact shape attainable with the structure of the present invention. In the preferred embodiment a compact carrying pouch 21 of the conventional drawstring type is provided to enclose the stand 10 and to serve the dual purposes of enclosure for easy transport and added restriction to prevent spontaneous assembly.

When the stand 10 is collapsed, as shown in FIG. 2, each of the elements comprising the legs 12, 14, and 16 and the vertical stand 20 are aligned in a parallel manner. The shock cord attachment structure permits this folding while maintaining the contiguity of the adjacent elements. The longitudinal length of the collapsed stand 10 is slightly greater than that of the parallel elements and the thickness is established by the thickness of the elements and the packing array.

Figure 3:
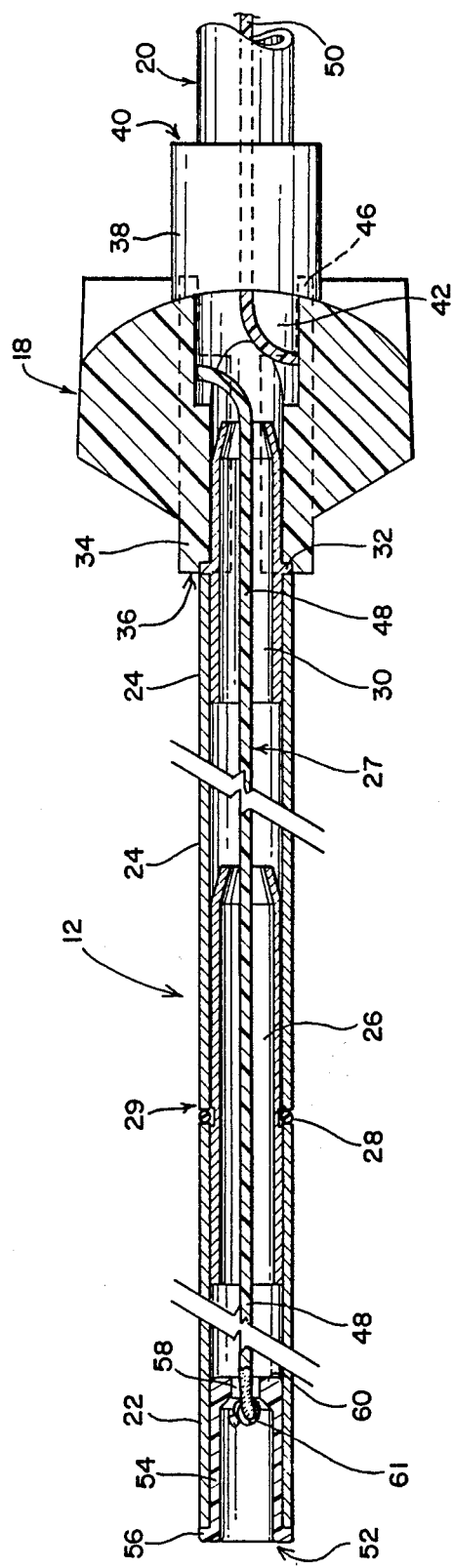
FIG. 3 is a cross sectional view taken along line 3–7 of FIG. 1, showing the components of one of the legs of the tripod stand.

The structure of the leg elements 12, 14, and 16 and the spider 18 understood in light of cross sectional view of FIG. 3. This illustration shows the interior structure and interconnection of these elements.

With the single exception of specific cording, the components which form the three legs, 12, 14, and 16 are identical in structure, so the following description, while citing only elements of the first leg 12, will apply to the second leg 14 and the third leg 16 as well.

The main components of the first leg 12 are a first tube 22 and a second tube 24. The first tube 22 is adapted to contact the ground or floor while the second tube 24 is adapted to fit into the spider 18. The two tubes 22 and 24 are joined end to end to form the leg 12. The tubes 22 and 24 are simply hollow, metallic (in the preferred embodiment, although other strong lightweight materials may be substituted) cylinders. The tubes 22 and 24 are joined to each other by means of a tube connector 26 and held in position by a cord element 27. The first tubes 22 and second tubes 24 are identical other than in the elements inserted into the ends thereof.

The connector 26 is a tapered tubular element, having a smaller diameter than that of the tubes 22 and 24 such that the connector 26 fits into the interior cavity of the first tube 22. The tube connector 26 also has a greater wall thickness than the tube 22 so that the tube connector 26 is more rigid, since it will bear interface stress.

The tube connector 26 is inserted less than halfway into the upper end of the first tube 22. The tube connector 26 is preferrably cemented to hold it in place in the first tube 22.

An O-ring 28 is placed around the tube connector 26 at the end of the first leg tube 22. The O-ring 28 provides a cushion for the joint formed when the two tubes 22 and 24 are connected. The exposed end of the tube connector 26 is beveled to ease the joining of the tube connector 26 affixed to the first tube 22 into the open end 29 of the second tube 24.

The legs 12, 14, and 16 are removably inserted into the spider 18 at an angle of approximately 30 degrees. The insertion is accomplished by means of an interference element in the nature of a base connector 30. The base connector 30 has the same general configuration as the tube connector 26, but with two main differences. The base connector 30 is shorter than the tube connector 26, and the O-ring 28 is replaced by a shoulder element 32 integral to the base connector 30.

The tetrahedral spider 18 (seen in FIG. 1 and FIG. 3) is trilaterally symmetrical about three vertical planes and is constructed so that there are three hollow leg seating elements 34 formed on a lower end 36, and a hollow vertical member seat 38 formed on an upper end 40. The spider 18 also includes a hollow cylindrical central element 42.

The leg seating elements 34 are integrally formed with the spider 18, and are constructed with holes drilled such that they accept the second tubes 24 at an angle in an underside portion 44 when the stand 10 is in its assembled position. The legs 12, 14, and 16 are thereby fixed at approximately a 30 degree angle to vertical in the assembled mode.

When the stand 10 is disassembled, the second tubes 24 are inserted in receiving holes in a topside portion 46 of the leg seating elements 34 for storage.

The vertical member 20 fits into the upper end 40 of the base 18. In the preferred embodiment this is a permanent adhesive connection. The vertical member 20 includes four first tubes 22, three of these including tube connectors 26, joined end to end. The three joints between the tubes 22 are identical to those in the legs 12, 14, and 16, formed with a tube connector 26 and an O-ring 28.

As seen in phantom in FIG. 1. the cord elements 27 that hold the legs 12, 14, and 16 in place and allow the automatic assembly of the stand 10 are more specifically identified as a first shock cord 48 and a second shock cord 50. The shock cords 48 and 50 are in the form of elasticized ropes.

The first shock cord 48 runs from the lower end of the first leg 12, upward through the spider 18, and returns downward through the second leg 14. The second shock cord 50 extends from the lower end of the third leg 16, upward through the base 18, and continuing through the vertical member 20 to its upper end.

The shock cords 48 and 50 are anchored at the outer ends of the legs 12, 14, and 16 and the vertical member 20 by means of an end plug 52. As detailed in FIG. 3, the end plug 52 consists of a hollow plug portion 54 and an enlarged cap portion 56. The end plug 52 is sized so that the plug portion 54 fits into the open end 29 of the appropriate first tube 22. The cap portion 56 overlaps the end of the first tube 22, thereby prohibiting the tension of the shock cords 48 and 50 from drawing the end plug 52 completely into the first tube 22. An end plug 52 is provided at the outer end of each of the legs 12, 14, and 16 and the vertical member 20.

The anchoring of the shock cords 48 and 50 is accomplished by passing the cords 48 and 50 through an opening 58 in an interior end 60 of the end plugs 52. A knot 61 is then tied in the ends of the shock cords 48 and 50. As the opening 58 has a diameter only slightly greater than that of the shock cords 48 and 50, once the cords 48 and 50 are knotted they cannot be drawn back through the opening 58.

The shock cords 48 and 50 are key elements in the operation of the tripod stand 10. The shock cords 48 and 50 are chosen to be of a length such that a constant tension is maintained in the assembled mode as well as the disassembled mode.

When the tripod stand 10 is disassembled it takes the configuration shown in FIG. 2. The disassembled stand 10 is simply the several tubes 22 and 24 bundled together about the spider 18. The tubes 22 and 24 are held in bundled mode by a strap 62. The strap 62, in the preferred embodiment, is made of velcro and is affixed to the vertical member 20 by means of a loop sewn in the end of the strap 62. The carrying bag 21 is provided so that the stand 10 may be easily carried in the disassembled mode.

Automatic assembly of the device begins by releasing the strap 62. The operator then grasps the uppermost tube 64 of the vertical member 20. The uppermost tube 64 is identified in a preferred embodiment by means of the end plug 52 being a different color than the end plugs 52 used in each of the legs 12, 14, and 16.

Assembly is accomplished simply by lifting the stand 10 by the uppermost tube 64. As the tube 64 is lifted, the first tube 22 directly below it aligns itself along the second shock cord 50. Gravity combined with the tension in the second shock cord 50 urges the tube connector 26 of the aligned first tube 22 into the open end 29 of the uppermost tube 64, forming a rigid joint. The remaining first tubes 22 of the vertical member 20 serially align themselves as the stand 10 is raised. The first tube 22 closest to the spider 18 is permanently attached in the vertical member seat 38. Further lifting of the device allows the second leg tubes 24 to mate with the leg seating elements 34. The first leg tubes 22 then mate with the second leg tubes 24.

The tension maintained by the first shock cord 48 accomplishes the assembly of the vertical member 20 and the third leg 16. Similarly, the serial assembly of the first and second legs 12 and 14 is accomplished via the tension of the first shock cord 48. An accomplished user, given enough open space, can assemble the entire tripod stand 10 with a single wrist flip.

Although the beveling of the ends of the connectors 26 and 30 eases the alignment of the leg tubes 22 and 24, sometimes a mild shaking of the stand 10 is required for all the connectors 26 and 30 to snap into place. Note that the entire assembly operation requires the use of only one hand. For a person of average height, the single grasping of the uppermost tube 64 is sufficient to allow complete assembly. A shorter person may be required to take a second grip lower on the assembled vertical member 20 to allow sufficient clearance for the legs 12, 14, and 16 to assemble themselves. In practice, assembly will usually be accomplished by holding the device aloft by the uppermost tube 64 and allowing the other elements to fall away from it.

It should be noted that, in order to maintain the rigidity of the tripod stand 10, the connectors 26 and 30 must be fairly closely fitted to the interior of the tubes 22 and 24, and the base 18.

It is envisioned that a ballast weight 66 that can be attached to the base 18 will be optionally provided. The ballast weight 66 is most useful for outdoor applications where wind may cause the stability of the stand 10 to be threatened. In one preferred embodiment, as shown in FIG. 1, the ballast weight 66 is a bag that can be filled with water.

Figure 5:
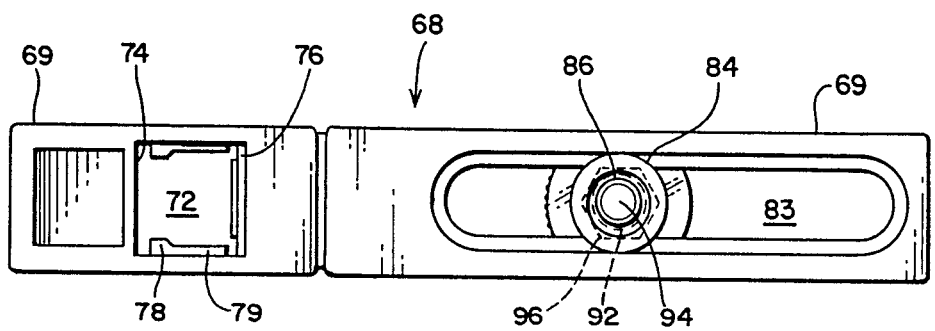
FIG. 5 is a top plain view of the attachment clamp.
Figure 4:
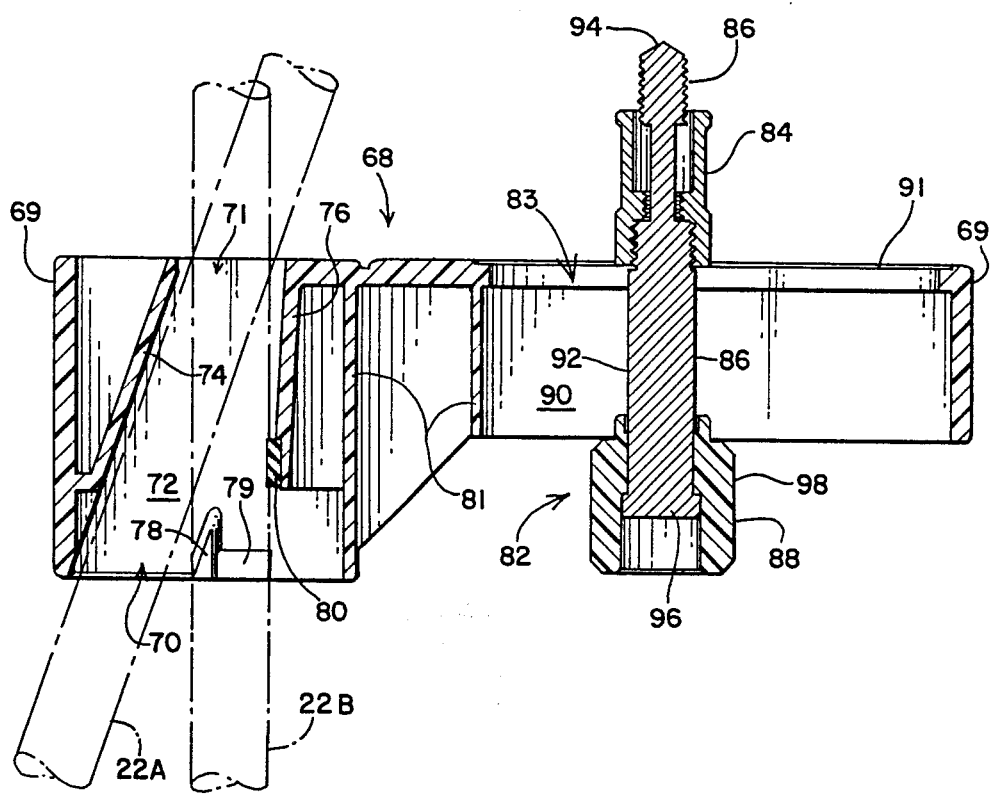
FIG. 4 is a cross sectional view taken along line 4—4 of FIG. 1, showing the attachment clamp.

Another important features of the overall invention is an attachment clamp 68 shown in FIG. 1, in cross section in FIG. 4 and in the top view of FIG. 5. The attachment clamp 68 allows photographic lights, or whatever other object may be desired, to be affixed to the tripod stand 10. The unique construction of the clamp 68 allows it to be operable using only one hand. The clamp 68 is best understood from the cross-sectional view of FIG. 4.

The clamp 68 is a hollow member including a structural frame 69 having vertical slots formed therethrough for receiving elements. The clamp 68 is attached to the stand 10 by sliding the vertical member 20 through a tube entry 70 formed on the bottom edge of the frame 69 and continuing trough a tube exit 71 on the top edge. While it is expected that the user will generally wish to position the light or other object on the vertical member 20, it should be noted that the clamp 68 may be mounted just as easily on any of the legs 12, 14, and 16.

A tube channel 72 is formed intermediate the tube entry 70 and the tube exit 71 and is laterally bounded by a sharply angled guiding partition 74 and a nearly vertical restraining partition 76. A stop member 78 in the form of a rounded protrusion is positioned of each of the walls of the clamp 68 is about the bottom center of the tube channel 72. When the clamp 68 is placed on a tube 22, the tube 22 slides within the tube channel 72 at an angle between the guiding partition 74 and the stop 78. Immediately after insertion, the tube 22 assumes the position shown in phantom in FIG. 4 and labelled as 22A. When the clamp 68 is in the desired vertical position, its attitude is adjusted by pressing down on the far end of the frame 69 from the tube channel 72, so that the clamp 68 approaches a position where it major axis is perpendicular to the tube 22 (phantom 22B in FIG. 4). The tube 22 is forced past the stop 78 and rests against a pair of restraining ridges 79 formed on both of the side walls of the frame 69. The relative magnitude of the protrusion of the stop 78 and the ridges 74 is illustrated in FIG. 5. The frame 69 is flexible enough so that the stops 78 are spread to permit passage of the tube 22. The tube 22 is then fixed in place by the stop 78, the restraining ridges 79, and the restraining partition 76. The slight angling of the restraining portion 76 increases the friction between the restraining partition 76 and the tube 22, causing the clamp 68 to be more firmly held in place. Friction between the tube 22 and the restraining partition 76 is further increased by the placement of a small rubber pad 80 at the lower end of the restraining partition 76.

The clamp 68 is released by forcing the arm 90 upward, which changes the position of the tube 22 from 22a to 22b, and allows the clamp 68 to move freely along the vertical member 20. Again, the mounting and adjusting of the attachment clamp 68 can be accomplished with one hand. Any number of attachment clamps 68 can be used with each stand 10.

Since the gate lock formed by the stop elements 78, the restraining ridges 79 and the restraining partition 76 is the force holding the mounted object in place, the distance between the stop 78 and the restraining partition 76 must be nearly equal to the diameter of the tube 22. The distance between the stop 78 and the guiding partition 74 is greater than the diameter of the tube 22 for ease of insertion and adjustment. In order to minimize material cost while maintaining strength the hollow frame 69 is provided with a pair of vertical reinforcing ribs 81. These ribs 81 prevent excessive flexing of the frame 69 during use.

The actual attachment of an object to the clamp 68 is accomplished by means of an independent mounting fixture 82 attached to the clamp 68 through a longitudinal slot 83 formed in the narrowed portion of the frame 69. The positioning of the slot 83 is best seen in FIG. 5. The preferred mounting fixture 82 is particularly adapted for receiving and securing conventional photographic lights and peripheral equipment and includes an interiorly threaded adapter 84, a dually exterioraly threaded attachment post 86, and a knob 88. The mounting fixture 82 is attached to an arm 90, the arm 90 being the narrowed portion of the attachment clamp 68. The slot 83 is formed in the upper surface of the frame 69 in the zone of the arm 90, and has a surrounding adapter receiving indentation 91, as best seen in FIG. 5.

The attachment of the mounting fixture 82 to the arm 90 is accomplished through the slot 83 in the arm 90. The interface adapter 84 is placed above the arm 90. The knob 88 is placed below the arm 90. The adapter 84 and the knob 88 are joined by the center post 86, which passes through the slot 83. The slot 83 is elongated longitudinally along the arm to 90 to allow the mounting fixture 82 to be moved within the indentation 91 horizontally relative to the attachment clamp 68. A center post base 92 has a larger diameter than an affixing post 94. The center post 86 is anchored in the knob 88 by means of a hexagonal head 96. The knob 88 is essentially hollow, but the interior of a knob upper half 98 is molded to conform to the shape and size of the head 96 and the lower portion of the center post base 92. Once the center post 86 is passed through the knob 88, the two components become integral. The diameter of the adapter 84 is larger than the slot 83 so that when the adaptor 84 is threaded onto the center post 86 which has been passed through the slot 83, the mounting fixture 82 is secured to the arm 90. A loose attachment allows the mounting fixture 82 to move in the horizontal plane along the arm 90, with the center post 86 sliding along the slot 83. The horizontal motion of the mounting fixture 82 may be arrested by tightening the knob 88. The mounting fixture 82 may be selected to permit attachment of a wide variety of attached items, so long as the attached item has a lower thread which mates with the affixing post 94. Depending on the item to be supported, the adapter 84 and the center post 86 may have varying diameters to assure a secure attachment.

Although it is understood that dimensions and materials of the components of the invention may be altered without departing from the invention, in a preferred embodiment 10 of the present invention, some of the dimensions and materials are as follows.

The tubes 22 and 24 are selected to be aluminum, 36.6 cm (14.4 in.) long. They have an exterior diameter of 1.59 cm (0.625 in.) and an interior diamater of 1.30 cm (0.513 in.). Assembled, the stand is 208.3 cm (82.0 in.) in height. There are ten tubes 22 and 24 per stand.

The tube connectors 26 are also aluminum, and are 11.4 cm (4.5 in.) in overall length, with 5.1 cm (2.0 in.) of the tube connectors 26 inserted into the first tubes 22. The exterior diameter of the tube connector 26 is 1.28 cm (0.505 in.), the interior diameter, 0.64 cm (0.25 in.). The base connectors 30 are aluminum as well and are 6.44 cm (2.54 in.) in overall length, with 3.81 cm (1.50 in.) of the base connectors 30 inserted into the second tubes 24.

The end plugs 52 are made of plastic, while the base 18 is made from nylon with a glass fill. The attachment clamp 68 is made from plastic, while the mounting fixture may be steel or strong structural plastic. The cord members 27 are conventional shock cords having a diameter of 0.476 cm (0.188 in.). The first shock cord 48 has an unstretched length of 95.4 cm (38 in.) and the second shock cord 50 has an unstretched length of 140.5 cm (56 in.).

Those skilled in the art will readily observe that numerous modifications and alterations of the device may be made while retaining the teachings of the invention. Accordingly, the above disclosure is not intended as limiting. The appended claims are therefore to be interpreted as encompassing the entire spirit and scope of the invention.

INDUSTRIAL APPLICABILITY

It is envisioned that the shock corded tripod stand 10 of the present invention will find its greatest use in the photographic industry. The stand 10 is ideal to support the lights required by the professional photographer.

The stand 10 when disassembled is only slightly over a foot long and stores easily in the carrying pouch 21. It is light, only 2.5 pounds, so it can be easily carried. Assembly is accomplished using only one hand. To assemble the stand 10, the strap 62 is unfastened, and the device is lifted by the uppermost tube 64. The shock cords 48 and 50 urge the tubes 22 and 24 into their fixed positions. A mild shaking may be required to aid in alignment. The fact that one hand operation of the attachment clamp 68 is possible allows the photographer to adjust his lighting without setting down his camera. Furthermore, multiple lights may be attached to each stand 10 with each being preattached to its own clamp 68 so that mounting may be easily accomplished with on hand.

The attachment clamp 68 has utility independent of the tripod stand 10. This element is adapted to operate effectively with any cylindrical support of the appropriate diameter. It may be used with any cylindrical post having a break or end permitting slippage of the clamp 68 over the post. Expected utility of the clamp, over and above that already described, will be found in any industry or hobby wherein it is desirable to easily secure items at varying positions along a cylindrical member.

This utility is enhanced by the extreme simplicity of adjusting the position of the clamp 68. A sharp upward thrust on the arm 90 causes the friction force of the stop element 78 and the restraining ridge 79 to be overcome and the relative position of the tube 22 to be moved from 22B to 22A. In position 22A sliding is permitted and the clamp may be moved longitudinally along the tube 22. This operation is easily accomplished with one hand.

The stand 10 is fairly simple to manufacture, therefore its retain price will be quite affordable. For this and the above reasons, it is envisioned that the shock corded tripod stand 10 of the present invention will enjoy widespread industrial applicability. It will have obvious applicability in the photography industry. The stand 10 can also be used anywhere else portable lighting is required. Indeed, it can be useful to anyone who requires adjustable elevation of relatively light objects. Therefore it is expected that the present invention will enjoy great commercial utility.

We claim:

1. A shock corded tripod stand, for use in providing a means to hold aloft various lightweight objects, comprising:
    three or more hollow segmented legs acting as support for the device, and to which the objects can be attached when desired;
    a hollow segmented vertical member to which the objects are generally attached;
    a spider assembly having a plurality of interconnected passages therethrough and including positions for receiving said legs and vertical member, acting as the interface between the legs and the vertical member;

one or more elasticized shock cords extending within said legs, said vertical member, and said passages to connect the device together, to provide tension during assembly of the device and to further maintain the device in its assembled position; and affixing means to hold the objects, said means being attachable to either the legs or to the vertical member.

2. The device of claim 1, wherein:

the device is adapted for automatic assembly, said automatic assembly being accomplished using only one hand, the device being raised from its disassembled position, and the segments of the vertical member and the legs serially joining to form a unitary device by action of gravity and of the tension of the shock cords.

3. The device of claim 1, wherein:

the segments of the legs and vertical member are cylindrical elements in the form of hollow tubes made of a rigid material.

4. The device of claim 3, wherein:

the joining of the segments to one another and to the spider assembly is accomplished by tapered connector elements.

5. The device of claim 4, wherein:

said connector elements are tubular elements, one end of each element being affixed in an end of one joining segment, the other end of the element being beveled to ease insertion into an open end of a second joining segment or into the spider.

6. A unitary collapsable shock corded stand, which may be automatically assembled, comprising:

a spider assembly having a plurality of interconnected passages therethrough and including positions for receiving three leg subassemblies and one post subassembly in a tetrahedral manner; and three leg subassemblies, each including a plurality of interlocking hollow segments serially placed along an elongated elasticised core element; and a post subassembly including a plurality of said hollow segments serially placed along one of said cord elements;

wherein said cord elements interconnect the spider assembly, the leg subassemblies and the post subassembly in a manner so as to urge said hollow segments into an interlocked position while permitting the device to be placed into a storage mode with the hollow segments in a noninterlocked mode with said hollow segments being arranged parallel to each other in said storage mode.

7. The stand of claim 6 wherein:

the spider assembly further includes a leg seating position for receiving and supporting each leg in said storage mode.

8. The stand of claim 6 wherein:

exactly two of said cord elements are provided with a first cord passing from the outermost of said hollow segments of a first leg subassembly through the spider assembly and extending to the outermost hollow segment of a second leg subassembly; and second cord passing from the outermost of said hollow segments of a third leg subassembly through the spider assembly and extending to the outermost hollow segment of the post assembly.

9. The stand of claim 8 wherein:

each leg subassembly includes:

a first type of said hollow segments adjacent to the spider assembly and provided with a spider interface connector and an open end;

a second type of said hollow segments including a segment interface connector adapted to fit into said open end of said first segment and having an opposing end cap to provide traction on the ground or floor surface, with said end cap providing the anchor for said associated cord element.

10. The stand of claim 9 wherein:

the post subassembly includes:

one of said first type of said hollow segments secured to the spider assembly;

two of a third type of said hollow segments, one end of said third type of said hollow segments having a segment interface connector adapted to fit into said open end of said first type of said hollow segment, and having an opposing open end; and one of said second type of said hollow segments.

11. The stand of claim 10 wherein:

the automatic assembly is accomplished from a disassembled mode by lifting upon said third segment of the post assembly in sufficient open space that the combined action of gravity and the elastic force of said cord elements causes spontaneous interlocking of said interface connectors with said segments and said positions on the spider assembly.

* * * * *